United States Patent
Johnson (10) Patent No.: US 10,619,621 B2
(45) Date of Patent: Apr. 14, 2020

(54) ENERGY CHAIN

(71) Applicant: John M Johnson, Santa Barbara, CA (US)

(72) Inventor: John M Johnson, Santa Barbara, CA (US)

( * ) Notice: Subject to any disclaimer, the term of this patent is extended or adjusted under 35 U.S.C. 154(b) by 0 days.

(21) Appl. No.: 16/507,892

(22) Filed: Jul. 10, 2019

(65) Prior Publication Data

US 2019/0331089 A1    Oct. 31, 2019

Related U.S. Application Data (63) Continuation-in-part of application No. 15/972,568, filed on May 7, 2018, now abandoned.

(60) Provisional application No. 62/533,183, filed on Jul. 17, 2017.

(51) Int. Cl.
| | |
|---|---|
| *F03B 17/06* | (2006.01) |
| *F03C 1/32* | (2006.01) |
| *F03C 1/26* | (2006.01) |

(52) U.S. Cl.
CPC ............ *F03B 17/06* (2013.01); *F03C 1/0415* (2013.01); *F03C 1/26* (2013.01); *F05B 2220/706* (2013.01); *F05B 2260/406* (2013.01)

(58) Field of Classification Search
CPC .......... F03B 17/06; F03C 1/0415; F03C 1/26; F03C 1/00; F05B 2200/706; F05B 2260/406; F04B 35/008; F04B 43/0063; F15B 15/106

See application file for complete search history.

(56) References Cited

U.S. PATENT DOCUMENTS

| | | | | | |
|---|---|---|---|---|---|
| 1,523,031 | A | * | 1/1925 | Mitchell, Jr. ......... | F03B 13/262 417/333 |
| 1,665,140 | A | * | 4/1928 | Master .................. | F03B 13/262 417/331 |
| 3,515,889 | A | * | 6/1970 | Archer .................. | F03B 13/187 290/53 |
| 3,536,929 | A | * | 10/1970 | Parker .................... | F03B 13/00 290/52 |
| 3,690,790 | A | * | 9/1972 | Hooper ................. | F03B 13/262 417/331 |

(Continued)

*Primary Examiner* — Thomas E Lazo
(74) *Attorney, Agent, or Firm* — Matthews, Lawson, McCutcheon & Joseph, PLLC (57) ABSTRACT

A system for producing drive energy includes a control unit, and an intensifier that receives water from a water source and oil from an oil source, pressurizes the oil, and transfers pressurized oil. The system also includes a compression cylinder that receives oil from the oil source and the pressurized oil from the intensifier so that oil collected in the compression cylinder is pressurized to a predetermined pressure, and that transfers the oil at the predetermined pressure. A control valve is provided for controlling the oil to be received by the compression cylinder from the oil source and for controlling the oil transferred at the predetermined pressure. The system includes a hydraulic motor that receives the oil transferred at the predetermined pressure, and utilizes the predetermined pressure to drive the hydraulic motor. The hydraulic motor turns a generator so that the generator produces energy without the expenditure of fossil fuel.

17 Claims, 7 Drawing Sheets

(56) References Cited

U.S. PATENT DOCUMENTS

| | | | | |
|---|---|---|---|---|
| 4,208,878 A | * | 6/1980 | Rainey | F03B 13/262 290/53 |
| 4,277,690 A | * | 7/1981 | Noren | F03B 13/187 290/42 |
| 5,765,375 A | * | 6/1998 | Lundback | F01L 5/06 60/398 |
| 6,772,592 B2 | * | 8/2004 | Gerber | F03B 13/1845 290/53 |
| 8,390,141 B2 | * | 3/2013 | Marelius | F03B 13/08 290/54 |
| 8,614,522 B2 | * | 12/2013 | Hahmann | F03B 13/187 290/54 |
| 9,458,843 B2 | * | 10/2016 | Cardelius | F04B 9/1172 |

* cited by examiner

ENERGY CHAIN

CROSS REFERENCE TO PRIOR APPLICATIONS

This application is a continuation in-part of U.S. patent application Ser. No. 15/972,568, filed on May 7, 2018, entitled ENERGY CHAIN, which claims the benefit of and priority to U.S. provisional patent application No. 62/533,183, filed on Jul. 17, 2017, entitled ENERGY CHAIN. The disclosures of the prior applications are hereby incorporated herein by reference in their entireties.

FIELD

The present invention relates, generally, to the field of energy generation, and more particularly toward systems and methods that produce energy through the harvesting of free water pressure.

BACKGROUND

Existing energy needs that are an alternative to fossil fuels are generally regarded as necessary in light of pollution, climate and the finite nature of fossil fuels. Some alternative energy sources heretofore applied in this cause have been the use of solar panels and wind turbines to create non-fossil fuel-generated energy. Solar and wind energy installations require about 700 times the land use than is required by the system and apparatuses of the instant disclosure.

Furthermore, wind turbines are problematic not only in that they kill flying wildlife, but also because Karman vortex sheets are produced by the circular turbine support tower. This creates swirling vortices by unsteady airflow, and separation and spinning eddies which can affect air flow over a long distance. Even large spacing between towers can cause early wind turbine blade failure. Land features can cause dramatic changes in wind speed producing large swings in power output.

Moreover, wind and solar power are dependent on unknown weather conditions that can change at any time, thereby necessitating the use of: (a) stand-by fossil fuel backup sources that use gas or coal power plants; or (b) lithium ion batteries. Lithium ion batteries are very costly to keep on standby, and the use of fossil fuel power plants circumvents the aim of solar and wind in the first place, which is to avoid their use.

Additionally, government subsidies are phasing out for wind and solar projects, and energy tax incentives are ending soon. Tariffs are being applied to imported low-cost solar panels. These policy matters have the effect of making wind and solar systems less competitive with new oil and shale oils, which are fossil fuels. Currently, the state of California receives about 10% of its useable electricity from solar power sources. One problem is that on sunny days, California has to pay other states to take the excess electricity, adding to the cost of solar energy. This problem is known as too much solar at the wrong time. Electromagnetic pulse (EMP) and natural or man-made radiation protection for wind and solar systems are very severe potential catastrophic issues that may or may not have an economic solution.

Furthermore, electric cars will be required to meet new auto emission rules, which mean more electric service will be generated to meet the demand. The cost and availability of electric power will become a problem for everyone. Converting to natural gas or another fossil fuel, which can leak, produces significant pollution, including methane, which is thirty times worse than carbon dioxide in its damaging effect on the environment.

SUMMARY

A need exists to provide a system that produces energy through the harvesting of free water pressure and that eliminates the need for fossil fuels for the drive energy to run electricity generators.

The present disclosure meets these needs.

The embodiments discussed herein may provide clean, unlimited near-free drive energy that matches grid use 24 hours a day, seven days a week, without the use of fossil fuel for the drive energy. Further, the embodiments discussed herein may have a low noise level, a small installation area, and minimal visual impact. For instance, the systems and apparatuses disclosed herein may be located underground. The disclosed embodiments may require relatively little civil work to support operation. The embodiments may also be considered portable. Many parts of the world have major population changes due to a number of causes including summer and winter vacations, and each of these may change power demands. Systems with a requirement for major civil works such as dams, nuclear, coal or gas require long distance high tension lines for distribution, all of which are very costly, dangerous, and apt to start fires. The embodiments discussed herein can put the distributed power where it is needed to support shifting demand without wasteful overbuilding. For example, sub cluster towers of the disclosed system can be trucked to a new location and be operating in hours in place of years. This capability of being transported provides an aftermarket resale value of the system that investors and banks appreciate.

Generally, the systems, methods and apparatuses of the disclosed embodiments are for pressure harvesting a drive force to produce electricity. The embodiments are directed to a fluid power system that may be made up of a number of pressure intensifiers linked together to form an energy chain that uses control valves to provide a sequence of operations required to produce electricity. The systems may be available twenty-four hours a day, seven days a week. The embodiments provide low cost, safe, green energy that may never be depleted, with no fossil fuel expended for the drive energy to run an electricity generator. The water force may be free on site; and very little, if any, water may be used.

Embodiments disclosed herein may provide a simple mechanical hydraulic system that is safe and dependable with low maintenance. Further, unlike solar and wind systems, the systems, methods and apparatuses of the disclosed embodiments can be located underground, where they can easily be protected and be immune to electromagnetic pulse (EMP), and can be adapted for the space colonization. All planets of any size have gravity and we must have water. This could use the water recycle system to also provide the electric power as required with a small amount of equipment. This combination could be an effective solution when solar energy is too weak.

One object of the present disclosure is to provide systems, methods and apparatuses that produce energy through the harvesting of free water pressure, and that eliminate the need for fossil fuels as the drive energy to run electricity generators. The embodiments of the present disclosure eliminate the diesel engine, diesel fuel, coal or natural gas for steam and water waste from hydro turbine power. Water pressure used by the disclosed embodiments can always be available as long as there is gravity, and gravity is free of charge.

Another object of the present disclosure is to provide systems, methods and apparatuses for renewable energy at low no cost which may never be depleted and is available 24 hours a day, seven days a week.

It is yet another object of the present disclosure to provide systems, methods and apparatuses for providing energy that can be used as the prime power producer or the backup system for solar, wind or fossil fuel dependent systems.

It is yet a further object of the present disclosure to provide systems, methods and apparatuses for producing energy that is variable, and can start or stop with very short notice to meet grid requirements.

In one embodiment, the "energy chain" of the present disclosure is a pressure-harvesting system used to drive a generator to produce electricity. The system may use a number of closed pressure intensifiers having a rolling diaphragm that eliminates sliding and breakaway friction. The rolling diaphragm allows operation of relatively low pressure water intensifiers to provide a relatively large force to pressurize hydraulic oil. The rolling diaphragm provides a no-leak separation between the oil and water. In the intensifier. A large diameter water cylinder using low water pressure lip type seals produce high drag, hysteresis and more leakage. The water/oil intensifiers may be linked together in a chain, each with its own controls and connection to a compression cylinder. The compression cylinder may be linked to a transfer cylinder, which may link to a control room pressure storage bank. In one example, the energy chain can produce 58,000 hydraulic horsepower per minute from less than one-quarter acre of space. Power or energy density may be the key to future low cost green electric power.

In one embodiment, a system for producing drive energy comprises a control unit; an intensifier that receives water from a water source and oil from an oil source, that pressurizes the oil, and that transfers pressurized oil out of the intensifier; a compression cylinder that receives oil from the oil source and the pressurized oil from the intensifier so that oil collected in the compression cylinder is pressurized to a predetermined pressure, and that transfers the oil at the predetermined pressure out of the compression cylinder; at least one control valve for controlling the oil to be received by the compression cylinder from the oil source and for controlling the oil transferred at the predetermined pressure; and a hydraulic motor that receives the oil transferred at the predetermined pressure, and that utilizes the predetermined pressure to drive the hydraulic motor.

In an embodiment, the system further includes an accumulator bank, wherein the oil transferred at the predetermined pressure is transferred from the compression cylinder to the accumulator bank, and from the accumulator bank to the hydraulic motor.

In an embodiment, the drive of the hydraulic motor turns an electric generator so that the electric generator produces electricity.

In an embodiment, the intensifier comprises an oil cylinder, and the control unit causes oil from the oil source to fill the oil cylinder and the compression cylinder.

In an embodiment, the intensifier further comprises a water cylinder, and the control unit causes water from the water source to be added under pressure to the water cylinder, wherein a force of the water under pressure in the water cylinder pressurizes the oil in the oil cylinder so that pressurized oil from the oil cylinder is transferred through the at least one control valve and into the compression cylinder to pressurize the oil in the compression cylinder to the predetermined pressure.

In an embodiment, the control unit causes the pressurized oil in the compression cylinder to be transferred at the predetermined pressure to the hydraulic motor to drive the hydraulic motor.

In an embodiment, the system comprises a plurality of intensifiers arranged in a series and in parallel.

In an embodiment, the system comprises a plurality of compression cylinders arranged in a series and in parallel.

In another embodiment, an intensifier comprises a water cylinder including at least one water port for receiving water from a water source and for discharging the water to a return tank; an oil cylinder including an oil port for receiving oil from an oil source and for discharging the oil under pressure; a water piston located in the water cylinder; an oil piston that is attached to the water piston and that protrudes into the oil cylinder; and a rolling diaphragm provided on the water piston and forming a seal between an outer circumferential surface of the water piston and an inner surface of the water cylinder, wherein the rolling diaphragm is configured to roll along the inner surface of the water cylinder and along the outer circumferential surface of the water piston while maintaining the seal, wherein the water piston is configured to move the oil piston within the oil cylinder upon receiving pressure from water exerted on the water piston from the water source, wherein the oil piston is configured to compresses the oil in the oil cylinder when the oil piston is moved by the water piston to pressurize the oil in the oil cylinder.

In an embodiment, the water piston comprises a surface area that faces the water received into the water cylinder, the oil piston comprises a piston head having a surface area that faces the oil received into the oil cylinder, and the surface area of the water piston is greater than the surface area of the oil piston head.

In an embodiment, a 37 inch diameter intensifier has a surface area of the water piston that is 1075.5 square inches, and the surface area of the oil piston head is 18.60 square inches.

In a further embodiment, a method for producing drive energy comprises filling an oil cylinder of an intensifier with oil from an oil source at a first predetermined oil pressure; filling a compression cylinder with oil from the oil source at the first predetermined oil pressure; adding water under pressure from a water source to a water cylinder of the intensifier, so that the water under pressure pressurizes the oil in the oil cylinder to a second predetermined pressure; discharging pressurized oil from the oil cylinder at the second predetermined pressure, and maintaining some of the pressurized oil at the second predetermined pressure and reducing some of the pressurized oil to a third predetermined pressure that is less than the second predetermined pressure; transmitting the oil at the third predetermined pressure to the compression cylinder so that oil collected in the compression cylinder is pressurized to the third predetermined pressure; transmitting the oil at the second predetermined pressure to the compression cylinder so that oil collected in the compression cylinder is transferred out of the compression cylinder at the third predetermined pressure; receiving the oil transferred from the compression cylinder at the third predetermined pressure at a hydraulic motor; and utilizing the third predetermined pressure to drive the hydraulic motor.

In an embodiment, the method further comprises discharging the oil at the third predetermined pressure from the compression cylinder to an accumulator bank, and then discharging the oil from the accumulator bank to the hydraulic motor.

In an embodiment, the method further comprises driving the hydraulic motor to turn an electric generator so that the electric generator produces electricity.

In an embodiment, the method further comprises moving the oil at the third predetermined pressure from the compression cylinder to a transfer cylinder, and then discharging the oil from the transfer cylinder to the hydraulic motor.

In an embodiment, the method further comprises discharging the oil at a pressure below the third predetermined pressure from the compression cylinder to the transfer cylinder.

In an embodiment, the method further comprises filling an oil cylinder of a second intensifier with oil from the oil source at the first predetermined oil pressure; adding water under pressure from the water source to a water cylinder of the second intensifier, so that the water under pressure pressurizes the oil in the oil cylinder of the second intensifier; and moving pressurized oil from the oil cylinder in the second intensifier at the second predetermined pressure, and maintaining some of the pressurized oil at the second predetermined pressure and reducing some of the pressurized oil to a third predetermined pressure that is less than the second predetermined pressure.

BRIEF DESCRIPTION OF THE DRAWINGS

For a better understanding of the present invention, reference is to be made to the accompanying drawings. It is to be understood that the present invention is not limited to the precise arrangement shown in the drawings. Customer and local conditions may require changes, but the concept may be the same.

DETAILED DESCRIPTION

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The present disclosure proposes the use of high-pressure hydraulic oil to drive a hydraulic motor to run, for example, an electricity generator. The embodiments discussed herein will provide a near free, unlimited, on-site energy source, and do away with the limited and expensive and polluting fossil fuel drive engine. It should be noted that even in a national emergency most of the water head pressure will still be available. That cannot be said about diesel oil or other trucked fuels. The disclosed embodiments use only water and oil pressure; after that, the water and oil may be returned to a tank for re-pressurizing and reuse so that neither the water nor the oil is lost.

Some embodiments of the present disclosure may beneficially provide a clean inexhaustible drive force to run generators for electricity. The combination of a compression cylinder and a pressure intensifier unit provides high pressure hydraulic oil to run a fluid motor drive for electricity. The concept is relatively simple, and can easily replace conventional drives such as diesel engines and fuel, nuclear reactors and fuel, steam and coal or gas, and even the carbon free dam hydropower systems. Dam hydropower uses spinning turbines consuming large amounts of water head pressure and water velocity. This waste of water could be eliminated in drought prone areas by replacing the turbine drives with the embodiments discussed herein. The disclosed embodiments would not kill fish, waste water, nor pollute the environment; and may operate at a lower cost per kilowatt hour. This would save valuable water and help clean the air for people and agriculture.

Figure 1:
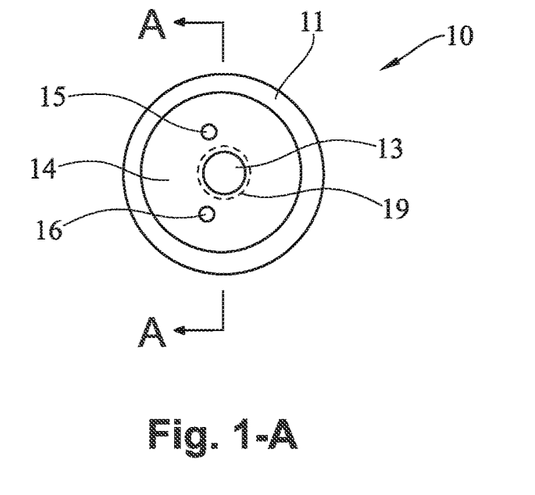
FIGS. 1A-1C illustrate aspects of a compression cylinder according to an embodiment.

Embodiments of the disclosed systems and methods may include the component parts illustrated in the accompanying FIGS. FIGS. 1A to 1C illustrate aspects of a compression cylinder 10 according to an embodiment. FIG. 1A is an end view of the compression cylinder 10. FIG. 1B illustrates a cross-sectional view of the compression cylinder 10, and shows the component elements of the compression cylinder 10. FIG. 1C is an end view of an end cap 14 of the compression cylinder 10. In FIGS. 1A to 1C, the compression cylinder 10 is drawn to a scale of 1 inch=10 inches. However, the compression cylinder 10 is not limited to such a size, and sizes larger or smaller than this scale are encompassed by alternative embodiments, depending on the requirements of the system in which the compression cylinder 10 is implemented. The compression cylinder 10 is formed of a main body 11 containing a piston 12 fixed to a guide shaft 13 that is movable within the main body 11. The guide shaft 13 may protrude through an end cap 14 located at each opposite end of the main body 11. In one embodiment, the end caps 14 may be threaded onto the main body 11. Each end cap 14 may include an oil intake port 15, 17 and an oil discharge port 16, 18, as shown in FIGS. 1A to 1C. Sealing elements 19 (e.g., lip type seals) may be provided on the piston 12 to form a seal between the piston 12 and the inner surface of the main body 11, and may be provided on the end caps 14 to form a seal between the end caps 14 and the outer surface of the guide shaft 13. The piston 12 moves within the main body 11 of the compression cylinder 10 in response to pressurized oil received in the main body 11 through the oil intake port 15, 17, and in response to oil transferred through the oil discharge port 16, 18.

The compression cylinder 10 collects an amount (volume) of pressurized oil from an intensifier 20 (discussed below), and transfers the full oil volume and pressure downstream. Pressure and volume are supplied as required from the intensifier 20 to give full compression oil for the compression cylinder 10 (e.g., in some cases about 9.2 gallons of oil). Excess oil pressure and volume may be relieved by a high pressure relief valve. In an embodiment, the compression cylinder 10 may have an outer diameter of 14 inches, an inner diameter of 11 inches, may be formed of ASTM A1063 material, and may have thread ends on the main body 11 for attaching the end caps 14. In one embodiment, the compression cylinder 10 may have a length of 37 inches. In an embodiment, the guide shaft 13 may have a nominal 3 inch outer diameter, may be around 67 inches in length, and may be formed of ASTM A-36 material. The piston 12 and guide shaft 13 may have a maximum stroke length of 30 inches in one embodiment. In an embodiment, the piston 12 may have a thickness of 4 inches, a nominal diameter of 10.984 inches and be formed of ASTM A-36 material. The end caps 14 may also be formed of ASTM A-36 material.

Figure 2:
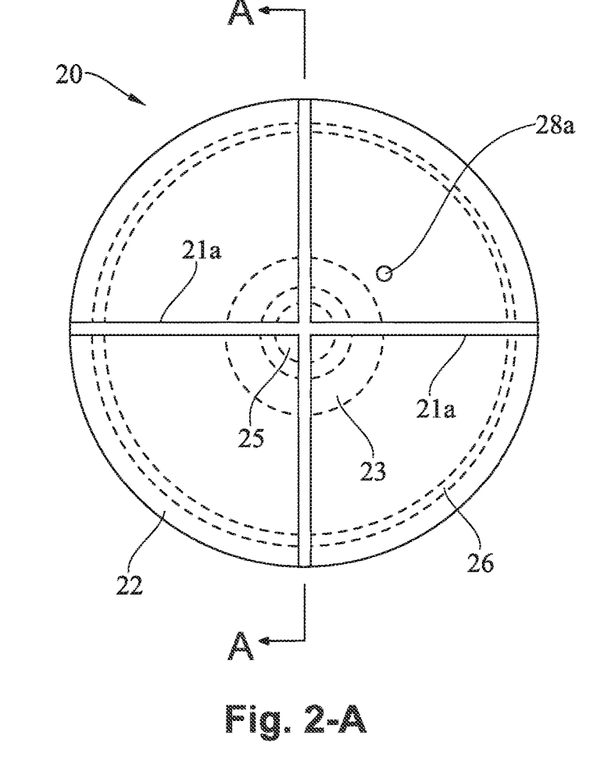
FIGS. 2A and 2B illustrate aspects of an intensifier according to an embodiment.

FIGS. 2A and 2B illustrate aspects of an intensifier 20 according to an embodiment. FIG. 2A is a plan view of the intensifier 20. FIG. 2B is a cross-sectional view of the intensifier 20. In FIGS. 2A and 2B, the intensifier 20 is drawn to a scale of 1 inch=10 inches. The intensifier 20 is formed of a water cylinder 21 provided with a cylinder cap 22 on one end of the water cylinder 21. The water cylinder 21 may have an outer diameter of 41 inches according to one embodiment. An oil cylinder 23 is located on the opposite end of the water cylinder 21, as shown in FIG. 2B, and may protrude from the water cylinder 21 about 7 inches in one embodiment. The oil cylinder 23 may have a nominal outer diameter of 8 inches, and an inner diameter of 4.9 inches (determined by seal requirements). Flanges 23a of the oil cylinder 23 may extend to a diameter of 14 inches on the water cylinder 21.

The intensifier 20 may include stiffener bars 21a on the cylinder cap 22. The water cylinder 21 contains a water piston 24 and a relatively smaller oil piston 25 that may be attached to, or formed in one piece with, the water piston 24. The oil piston 25, which may have a nominal 4.875 inch outer diameter (determined by seal requirements), is designed to protrude into the oil cylinder 23 upon movement of the water piston 24, which results from a water pressure force being exerted on the water piston 24. The oil piston 25 may be provided with seal elements 25a on an outer surface of the oil piston 25. The stroke length of the water piston 24 may be 2.75 inches in an embodiment. The stroke length of the oil piston 25 may be 2.68 inches in an embodiment. In some embodiments, a portion of the oil piston 25 may be located within the cylinder 23 before movement of the water piston 24. A rolling diaphragm 26 also is located within the water cylinder 21 and on the water piston 24 to form a seal between an outer circumferential surface of the water piston 24 and an inner surface of the water cylinder 21, as shown in FIG. 2B. The rolling diaphragm 26 may include flanges 26b that are attached to a cylinder cap 22 facing surface 24a of the water piston 24 via one or more retainers 27. When the water piston 24 is moved by a water pressure force, the rolling diaphragm 26 is configured to roll along the inner surface of the water cylinder 21 and along the outer circumferential surface 24b of the water piston 24 while maintaining the seal. In this way, sliding friction of the rolling diaphragm 26 against the inner surface of the water cylinder 21 is avoided. The rolling diaphragm 26 thus has an advantage over conventional O-ring type seals, which typically have a high coefficient of friction against a sealing surface. In those cases, the surface abutting the O-ring must be smoothed (e.g., machined) in order to reduce friction. The rolling diagraph 26 avoids that situation, and therefore reduces costs because there is no need to machine a smooth surface. In this regard, the rolling diaphragm 26 also allows for lower tolerances between the water piston 24 and inner surface of the water cylinder 21, which further reduces costs. Because friction risks breaking the integrity of the seal formed by the diaphragm, the sealing function is improved by the rolling nature of the rolling diaphragm 26.

One or more water ports 28a are provided in the cylinder cap 22 for ingress or egress of water from a water source (discussed below). In addition, a static air port 28b may be provided in the water cylinder 21 on a portion of the water cylinder 21 that is opposite the cylinder cap 22, so as to provide a no-pressure air pocket in the water cylinder 21 between the water piston 24 and the oil cylinder 23. The no-pressure air pocket is important for keeping the rolling diaphragm 26 from distortion and reversal. The oil cylinder 23 may include an oil intake port 29a and an oil discharge port 29b for ingress and egress of oil, respectively, from an oil source (discussed below). When the oil cylinder 23 is filled with oil, e.g., via the oil intake port 29a, water entering the intensifier 20 via the one or more water ports 28a through the cylinder cap 22 may exert a pressure force on the water piston 24 that causes the water piston 24 to move toward the oil cylinder 23, thus moving the oil piston 25 within the oil cylinder 23 to compresses the oil in the oil cylinder 23. The compression of the oil in the oil cylinder 23 causes the oil in the oil cylinder 23 to be pressurized. The pressurized oil may then be transferred from the oil cylinder 23 through the oil discharge port 29b to the compression cylinder 10, as discussed below.

In one embodiment, the intensifier 20 may have an overall diameter of 37 inches, and may be for stationary use. The intensifier 20 uses the relatively large water piston 24 to push the oil piston 25 into the relatively smaller oil cylinder 23 (e.g., as shown in FIG. 2B). This larger area of low water pressure may provide a force large enough to compress approximately 50 cubic inches of hydraulic oil to 5600 PSI. The 50 cubic inches can increase to 100 cubic inches by changing the length of the water cylinder, the oil cylinder, and the rolling diaphragm 26, and adding spacers to have a variable output. A 37 inch intensifier 20 may require either a service pressure of 100 PSI or a water boost pump to 100 PSI, or combination thereof for the 50 to 100 cubic inches for high oil pressure to result in full pressure energy. The movement of the water piston 24 pushes a volume of high pressure oil from oil cylinder 23 of the intensifier 20 to the compression cylinder 10. The high pressure oil (e.g., at 5300 PSI or at 5600 PSI) may be passed through one or more control valves to an accumulator bank, from which the pressurized oil is used by a hydraulic motor to run an electricity generator. A sequence processor may start to harvest pressures on relatively large systems of intensifiers 20/compression cylinders 10 using a time delay sequence series and multiple delivery lines to the accumulator bank. In an embodiment, a relatively large system may include a chain(s) of 2,000-3,000 intensifiers; 2,000-3,000 compression cylinders 10, and multiple accumulator banks. Depending on the line size and flow rates, all "energy chains" in a group may be started at the same time for maximum output and faster start-up. The intensifier 20 can employ a hydraulic source for oil to fill the oil cylinder 23 and retract the water piston 24 at a low pressure. For instance, low pressure oil (e.g., at 25 PSI to 150 PSI) used to fill the oil cylinder 23 pushes the water piston 24 back into its initial starting position to begin the next cycle. Multiple cycles may be required of the intensifiers 20 for pressure and compression of the compression cylinders 10 and the accumulators ACCU-1, ACCU-2 (see FIG. 5).

The size of the intensifier 20 and its configuration may be determined by a cost benefit analysis of the site, the resources and support. If a dependable pressure greater than 100 PSI or higher boost pump pressure, or combination, is available, then the diameter of the water piston 24 in the intensifier 20 can be reduced from the 37 inches. A preferred working pressure for the rolling diaphragm 26 is 100 PSI. If a higher working pressure is used, the size of the intensifier 20 (and the water piston 24) can be reduced, or the size of the intensifier 20 can be increased, and a lower water pressure and be used to produce the force necessary to move the water piston 24 and compress the few cubic inches of compression required.

The size of the rolling diaphragm 26 is also variable depending on the use requirements of the system. The rolling diaphragm 26 may be formed of elastomeric material in the shape of a truncate cone section to operate at diameter sizes from 15 inches to 96 inches. The elastomeric material of the rolling diaphragm 26 should be designed to have a service life of 1800 hours. Lubrication with a release agent may be made to the rolling diaphragm 26 every 600 hours. The temperature range of the rolling diaphragm 26 may be from 32 degrees F. to 120 degrees F. The pressure side of the rolling diaphragm 26 may be in fresh or salt water, and the opposite side of the rolling diaphragm 26 may be in static air with possible oil contamination. There should be no leakage between the sides of the rolling diaphragm 26, and the rolling diaphragm 26 should be allowed free action without distortion, stretching, or ballooning during its stroke. The opposite side of the rolling diaphragm 26 (i.e., the side facing the oil cylinder 23) defines a part of the no-pressure air pocket having static air with no pressure.

The pressure in the compression cylinder 10 may be a function of hydraulic motor requirements implemented in the system and the size of the intensifier 20. A lower first stage water pressure will require a larger water cylinder 21 diameter to provide the force to compress the hydraulic oil in the smaller intensifier oil cylinder 23. The evaluation is between water cylinder area or force and community water service pressure. If required, service pressure may be increased by adding a boost pump or second tandem small intensifier, or make the intensifier 20 (and the water piston 24) a larger diameter.

The following fluid power formulas may be used with the systems, methods, and apparatuses disclosed herein.
Pump Input Power-In Horsepower:

$$\text{Horsepower Input} = \frac{\text{Flow Rate output } (GPM) \times \text{Pressure } (PSI)}{1714 \times \text{Efficiency (over all)}}$$

Compressibility of Oil (½% per 1000 PSU Approximate) (In additional required oil) (Cylinder full 0 Press):

$$\text{Additional Volume} = \frac{\text{Pressure } (PSI) \times \text{volume of oil (to pressure)}}{250,000}$$

$$\text{Fluid Motor Power in HP Output} = \frac{\text{Torque Output (inch pounds)} \times RPM}{63025}$$

$$\text{Kilowatts} = HP \times 0.7457 \ (1 - HP)(550 \ \text{ff/LBS per second})$$

Figure 3:
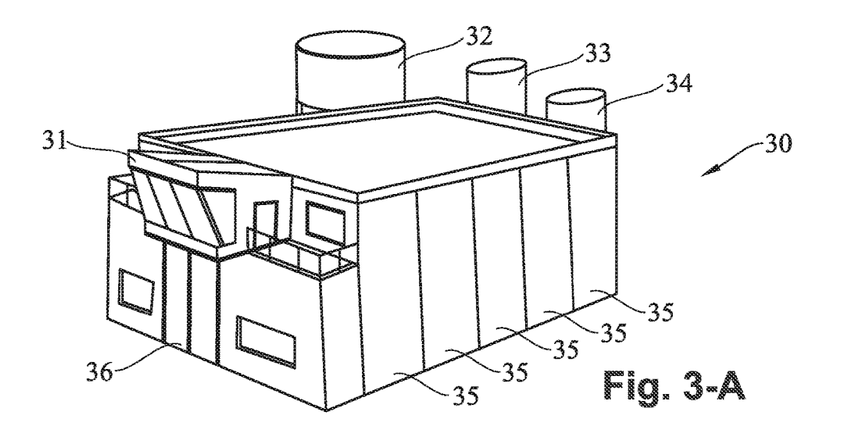
FIGS. 3A-3D illustrate aspects of a power generation building according to an embodiment.
Figure 4:
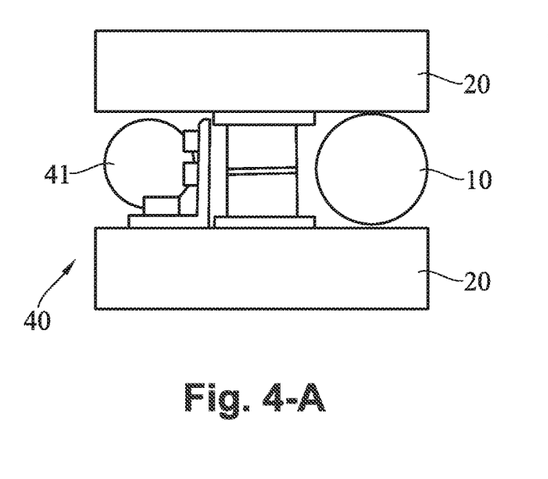
FIGS. 4A-4E illustrate aspects of an assembly of intensifiers and tower groups according to an embodiment.

FIGS. 3A-3D illustrate aspects of a power generation building 30 according to an embodiment. FIG. 3A is a perspective view of the power generation building 30. The power generation building 30 may be located above ground or underground. The power generation building 30 building may contain assemblies of compression cylinder 10/intensifier 20 units 40 stacked in a column 42, a sub-cluster 43 of columns, and/or tower clusters 44 of sub-clusters 43, as discussed with respect to FIGS. 4A to 4E. The power generation building 30 may include a control room 31 with controls for controlling the systems, methods and apparatuses discussed herein. For instance, the control room 31 may include a computer, or control unit, with a computer processor (central processing unit, CPU) that executes software programs for controlling operations associated with the compression cylinder 10, the intensifier 20, the water source, the oil source, and various control valves and/or pressure relief valves that open and close to regulate the water pressure and oil pressure in the system connecting these components and the other components discussed herein. The software programs may be recorded on a computer-readable recording medium, such as a CD-ROM, or temporary storage device that is removably attached to the computer. Alternatively, the software programs may be downloaded from a remote server and stored internally on a memory device inside the computer. The control room 31 may include mechanical controls that control the system and components. That is, manual and autonomous controls may be located in the control room 31. If the "energy chain" system is located underground or in a protected building, EMP radiation should be of no concern, and modern electronics can be used with the computer processor for all valves and controls. The timing of actions may come from signals indicating cylinder positions, pressures and safety items such as hydraulic leak alarms or electricity, or generator problems which trigger an automatic shutdown of the unit with the problem. The computer processor may comprise several processors working together, for example, one processor servicing one sub-cluster 43 (see FIG. 4D) of intensifiers 20. Processor groups may be scheduled to fit output schedules to keep hydraulic flow rates to a minimum in order to match maximum generator output.

The power generation building 30 may include, or be attached to, or in fluid communication with, a water tank or reservoir 32, a pressurized water tank 33 (e.g., a water source at 100 PSI), and a hydraulic oil source 34 (e.g., a hydraulic oil tank). The water tank or reservoir 32 provides water that is pressurized to the pressurized water tank 33, which in turn transfers pressurized water to the intensifiers 20 in the unit 40. The filtration return and re-pressuring may be a buy-out with re-pressuring from utility water pressure. The water pressure in the water source 33 may be increased from the water utility service to more than the service pressure. The hydraulic oil source 34 provides oil to the intensifiers 20 and to the compression cylinder 10 in the unit 40. The power generation building 30 may further include removable side panels 35 for easy access to the units 40, columns 42, sub-clusters 43 and tower clusters 44 in the power generation building 30. The removable side panels 35 may optionally be roll-up panels in an embodiment. Main access 36 may comprise doors for entry into the front of the power generation building 30 and to the control room 31. Access may also be provided in the rear of the power generation building 30.

FIG. 3B is a front view of the power generation building 30; FIG. 3C is a side view of the power generation building 30 showing five removable side panels 35; and FIG. 3D is a schematic plan view of the power generation building 30. In one embodiment, the power generation building 30 may be 85 feet long, 71 feet wide, and 21.5 feet high at the top of the removable side panels 35. FIG. 3D shows that the power generation building 30 has twenty locations for twenty tower clusters 44. A portion of the power generation building 30 is provided with an area for an accumulator bank 37 that includes accumulators that store pressurized oil that is to be fed to a hydraulic motor 39. Another portion of the power generation building 30 is provided with an area for the hydraulic motor 39, as well as an electric generator 50 (see FIG. 5), or other type of energy generator. FIG. 3D also shows that the control room 31 includes system controls 38, such as the computer, or control unit, and software programs discussed above. The length of the areas for the accumulator bank 37 and the hydraulic motor 39 may be 15 feet, and may be several feet high in order to provide the accumulator bank 37 and the hydraulic motor 39 on multiple levels. For example, many accumulator banks 37 and many hydraulic motors 39 may be stacked on top of each other, e.g., on shelves. FIG. 3D further shows that ten tower clusters 44 can be used at one time: Lines A-B first, and then Lines C-D, e.g., one minute apart.

FIGS. 4A-4E illustrate the buildup of compression cylinder 10/intensifier 20 units 40 into a column 42 of units 40, and then an assembly columns 42 into a sub-cluster 43 of four columns 42, and finally to a tower cluster 44 of four sub-clusters 43, according to an embodiment. A tower cluster 44 may fit one of twenty locations in the power generation building 30 (see FIG. 3D). FIG. 4A illustrates a unit 40 including two intensifiers 20 and a compression cylinder 10, along with controls/plumbing 41 that connect and control the flow of pressurized oil from the intensifiers 20 to the compression cylinder 10, as discussed below with respect to FIG. 5. In one embodiment, the height of the unit 40 may be 35.5 inches and have an overall diameter of 41 inches. FIG. 4B illustrates a close-up view of an upper portion of the column 42 shown in FIG. 4C. The column 42 is made up of a plurality of units 40. The column 42 may include seven units 40 (fourteen intensifiers 20) and have a height of 248.5 inches, in one embodiment. In other embodiments, the column 42 may include more or less units 40. FIG. 4C shows a sub-cluster 43 of four columns 42, having a height of 252.5 inches and an area of 7.1 square feet according to one embodiment. FIG. 4E illustrates an assembly of a tower cluster 44 formed of four sub-clusters 43. The sub-clusters 43 may be moved to or from the tower cluster 44 via an air bearing transfer system 45. The bearing transfer system 45 allows maintenance of the system by having access to each column in each sub-cluster 43 for change-out within minutes of a problem.

As an example, columns 42 formed of intensifiers 20 having a 37 inch diameter water piston 24 and subjected to a water pressure of 100 PSI, in a building of approximately 5,000 square feet floor area, can produce over 58,000 hydraulic horsepower for the hydraulic motor 39 to electric generators for producing electrical energy. Off/On solenoid control valves for operations timing may be used depending on the system requirements. The hydraulic schematic shows the basic concept of the water and hydraulic oil transfer system sized (large or multiple) to fit the timing and flow requirements. The Intensifiers 20 discussed herein may have an oil output of 9.21 GPM. The variables, water cylinder size, pressure of water, oil pressure and how the water cylinder 21 and the compression cylinder 10 are pressurized may change depending on system and/or site requirements. The embodiments discussed with respect to FIGS. 3A to 4E (no scale) may be implemented in an 85 foot×71 foot power generation building 30 for the "energy chain" installation. The power generation building 30 may be located above ground or underground, and/or sealed to EMP pulse radiation with covered windows. All controls and power generation may be in this building or adjacent tanks. The illustrated system uses twenty tower clusters 44 each having 224 intensifiers 20, for a grand total 4480 intensifiers 20. The system may operate with ten tower clusters 44 each on a one-minute power cycle and a fifty-two second recycle. This gives an output of 2240 intensifiers per minute (9.21 GPM —one tower is 14 intensifiers high for a total of 56 intensifiers). The system may produce the energy of approximately 58,000 hydraulic HP from a small land area of less than one-quarter acre. Usually, energy density is the key to lower cost. For underground tunnels or low overhead, intensifiers 20 can be arranged in four, six or eight high assemblies and be as long as needed. Major advantages to locating the system underground include security, protection from weather and from radiation, as well as clear from public view without noise.

Figure 5:
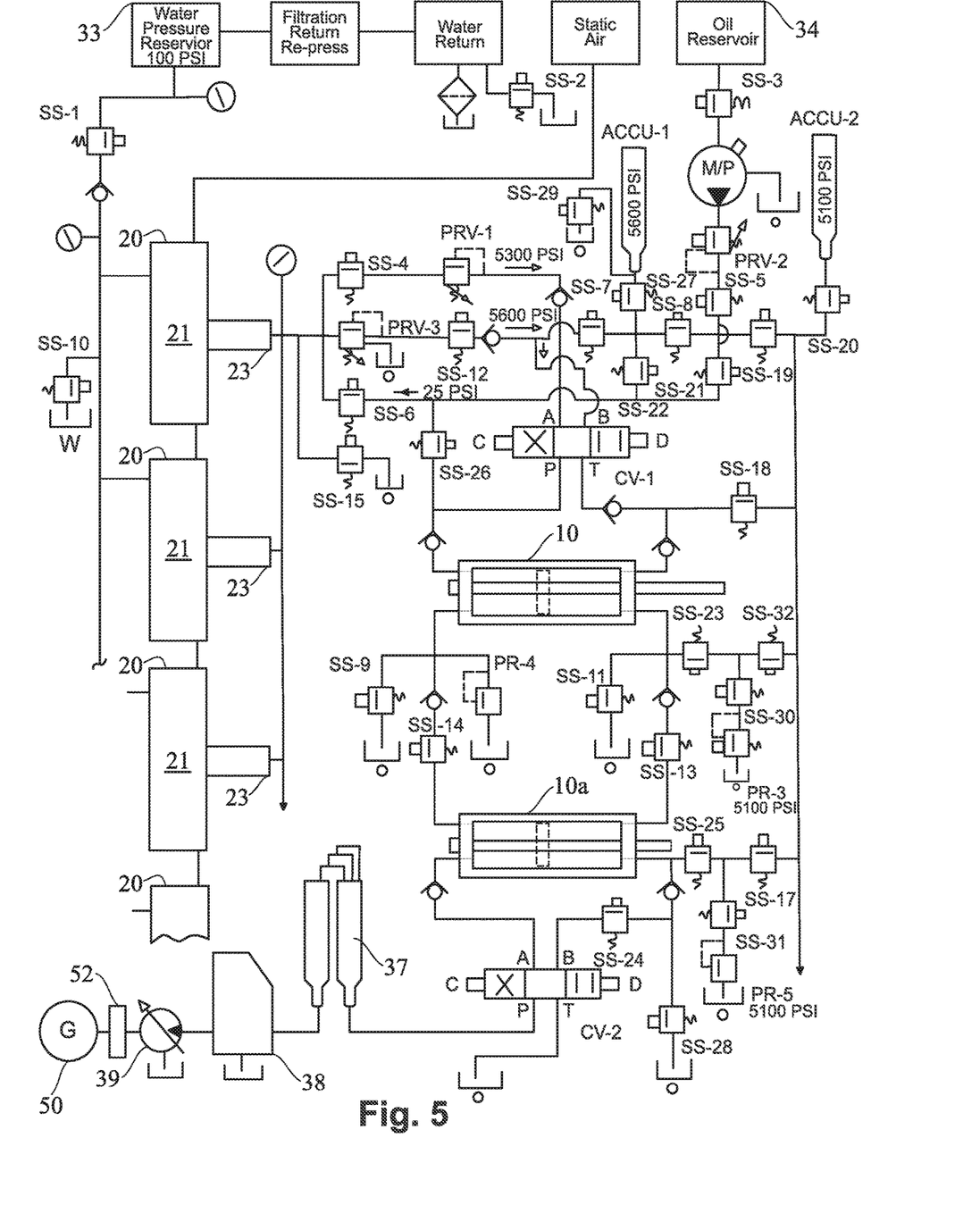
FIG. 5 is a schematic representation of a system for producing drive energy, according to an embodiment.
Figure 6:
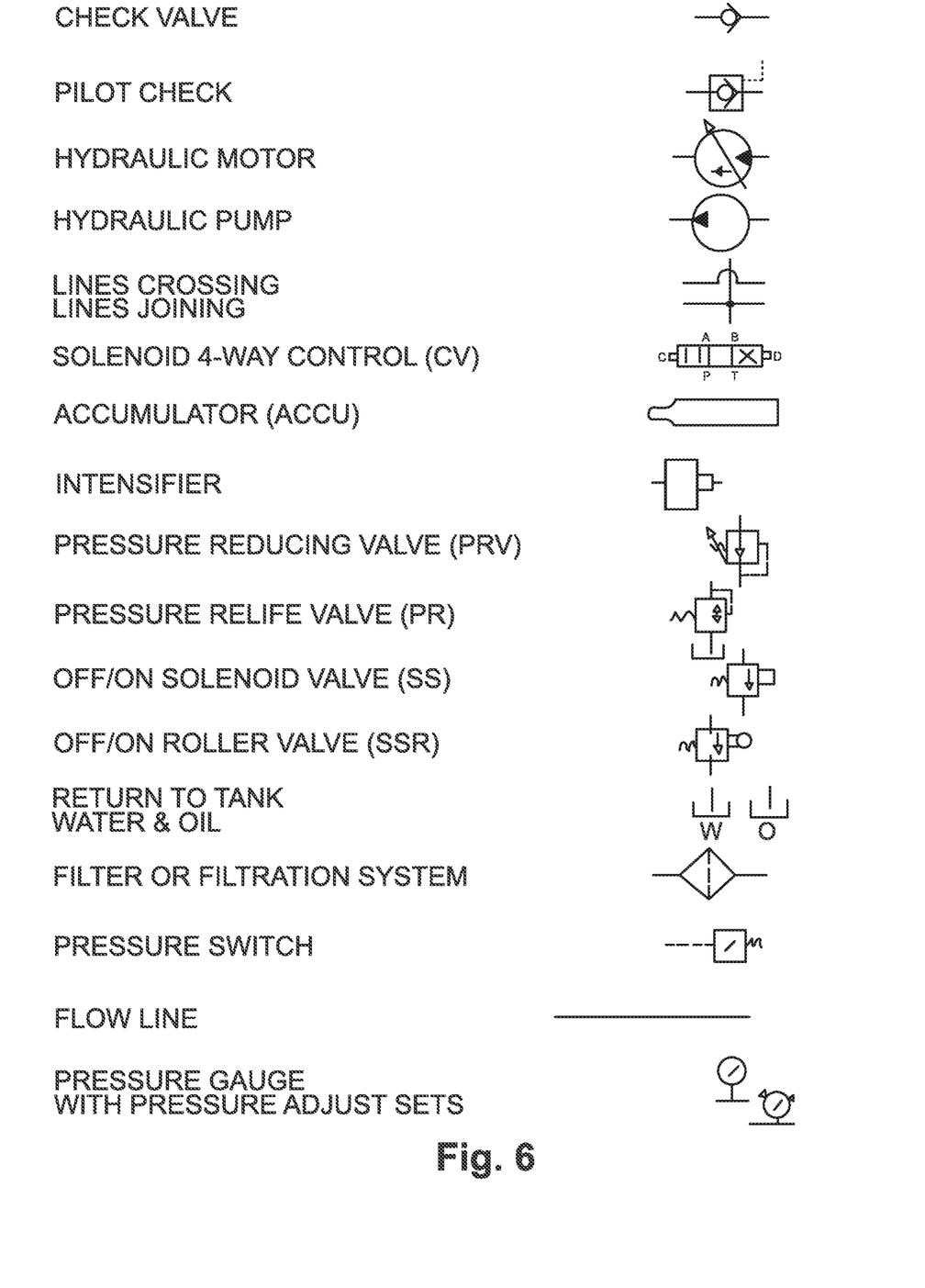
FIG. 6 is a legend for component parts illustrated in FIG. 5.

FIG. 5 is a basic logic hydraulic schematic of a system and method for producing drive energy, according to an embodiment. FIG. 6 is a legend for understanding component parts illustrated in FIG. 5. FIG. 6 uses existing ANSI (American National Standards Institute) symbols. (1967 symbols roughly equivalent to ISO (International Standards Organization) symbols.) The fluid systems are those that transmit control power through the use of pressurized fluid within a closed circuit. Graphic symbols emphasize the function and the methods of operation of the components. No size or specifications for the symbols are indicated; and only the general type of fluid function for the symbols is meant to be identified. Some symbols do not have identification, such as check valves line crossing, lines joining, and tank returns. Other symbols have an identification number to show location on the schematic and basic sequence. FIG. 5 shows only fluid system flow with the basic type of control valve—not size, manufacturer, pressure rating, mounting details, block type or cartridge (for porting block), etc. The schematic in FIG. 5 may include a vertical line of up to fourteen intensifiers 20 in series. In other embodiments, more or less than fourteen intensifiers 20 may be provided. Regardless of the number of intensifiers 20 in a system, each intensifier 20 has an accompanying compression/transfer cylinder 10. Thus, while FIG. 5 shows only two compression cylinders 10 (i.e., a compression cylinder 10 and a transfer cylinder 10*a*), many compression cylinders 10 (and transfer cylinders 10*a*) may be provided as needed. It is noted that the general arrangement of the system of FIG. 5 can be in many forms, above ground or below ground, in a building or in open space, and may be arranged vertically or horizontally. For example, FIGS. 3A to 3D show a vertical tower installation for the system, large enough to support neighborhood power requirements and feed an electricity grid. In addition, the system in FIG. 5 involves distributing oil pressure and volume to the different components of the system. To obtain the predetermined pressures discussed herein, it is important that the correct, or corresponding, volume of oil necessary to obtain those predetermined pressures be transferred to the component that is to have the predetermined pressures. That is, the predetermined pressures are obtained by transferring a specific volume of oil under the predetermined pressure to the components of the system, e.g., the compression cylinder 10, the oil cylinder 23, the accumulator bank 37, etc. For instance, the pressurized oil from the oil cylinder 23 should be at least the amount of cubic inches (e.g., 50 cubic inches) required for the volume of the compression cylinder 10 (e.g., 9.2 gallons). Accordingly, in this disclosure, it is to be understood that whenever oil is "transferred", "transmitted", "moved" or "discharged" under a predetermined pressure or other pressure, a volume of that oil required for establishing that pressure is transferred, transmitted, moved and/or discharged.

The operation of the "energy chain" system according to one embodiment will be described with respect to FIGS. 5 and 6. Other embodiments may include a similar or expanded configuration, meaning that the number of intensifiers 20 and compression cylinders 10, along with the several valves and other devices associated with transferring oil to and from components in the system, may be increased. The first step in the system of FIG. 5 is to ensure that the oil cylinder 23 in the intensifier 20 and the compression cylinder 10 are completely full with oil at some pressure. This may be accomplished by opening solenoid valve SS-3 and using the hydraulic pump to transmit oil from the oil source 34 through the line to the intensifier 20 with pressure reducing valve PRV-2 and solenoid valves SS-5, SS-21, SS-6 and SS-10 in the open position. At the same time, the hydraulic pump also transmits oil from the oil source 34 through the line to the compression cylinder 10 with pressure reducing valve PRV-2, and solenoid valves SS-5, SS-21, SS-26, and SS-11 in the open position. In each case, the oil pumped into the oil cylinder 23 in the intensifier 20 and into the compression cylinder 10 may be at a relatively low pressure, for example 25 PSI to 150 PSI. Filling the compression cylinder 10 causes the piston 12 in the compression cylinder 10 to be in the extended position (e.g., to move against the end cap 14 on the right side of the compression cylinder 10) so as to be ready for a full piston stroke in an opposite direction (the retracted position) toward the other end cap 14 on the left side of the compression cylinder 10.

Upon indication that the oil cylinder 23 and the compression cylinder 10 are completely full (at a pressure of e.g., 25 PSI to 150 PSI), and the piston 12 is in the extended position, compression of the oil in the compression cylinder 10 can begin. To do so, all valves closed, except for solenoid valve SS-4, pressure reducing valve PRV-1, and solenoid 4-way controller CV-1. Solenoid D of the solenoid 4-way controller CV-1 opens ports A to P to allow the oil in the line to pass into the compression cylinder 10. In addition, solenoid valve SS-1 is opened so that water from the water source 33, at a pressure of e.g., 100 PSI, fills the water cylinder 21 of the intensifier 20 with water. In a system with many intensifiers 20, all of the water cylinders 21 of the intensifiers 20 are filled with water. As the water pressure builds in the water cylinder 21, the pressure exerts a force on the water piston 24 causing the water piston 24 to move, which in turn will move the oil piston 25 to protrude into the oil cylinder 23 and compress the oil in the oil cylinder 23. The compressed oil may be pressurized to 5600 PSI, and may exit the oil cylinder 23 at this pressure through the oil discharge port 29*b*. The pressurized oil from the oil cylinder 23 should be at least the amount of cubic inches (e.g., 50 cubic inches) required for the volume of the compression cylinder 10 (e.g., 9.2 gallons). The pressure reducing valve PRV-1 reduces some of the oil pressure to a service pressure of, e.g., 5300 PSI in one embodiment, and the oil at 5300 PSI service pressure is delivered into the compression cylinder 10, via the oil intake port 15, through opens ports A to P of the 4-way controller CV-1 so that the compression cylinder 10 is full of oil at 5300 PSI. All valves are then closed. In some cases, the remaining oil transferred at the 5600 PSI from the oil cylinder 23 may be delivered to accumulator ACCU-1. Next, the oil at the service pressure of 5300 PSI may be delivered to a transfer cylinder 10*a*, which is structurally similar to the compression cylinder 10, and may be considered a second compression cylinder 10. To do so, the first step is repeated (e.g., a "recycle step") such that the water piston 24 and the oil piston 25 are retracted with solenoid valve SS-10 open. Then, pressure reducing valve PRV-3, solenoid valves SS-12, SS-7, SS-27, ports B to T of 4-way controller CV-1, and solenoid valves SS-14, SS-24, SS-28 are opened. Solenoid valve SS-1 is also opened to start transfer. The remaining oil transferred at the 5600 PSI from the oil cylinder 23 is then delivered through ports B to T of the 4-way controller CV-1 and into the compression cylinder 10 via oil intake port 17 on the opposite side of the compression cylinder 10. The 5600 PSI oil may be referred to as the transfer pressure. The 5600 PSI oil causes the oil piston 12 to retract (stroke toward the other end cap 14 on the left side of the compression cylinder 10) so that oil at service pressure, e.g., 5300 PSI, is transferred from the oil discharge port 16.

On transfer, solenoid valve SS-23 may be opened so that the 5600 PSI oil is transferred out of the compression cylinder 10 via oil discharge port 18, and is lowered to a pressure of 5100 PSI via pressure relief valve PR-3. Solenoid valve SS-30 protects the pressure going to pressure relief valve PR-3. The 5100 PSI oil may then be transferred to accumulator ACCU-2 with solenoid valve SS-20 opened, to be used for a new cycle of 5300 PSI service pressure to retract cylinder 10. Alternatively, the excess fluid at 5600 PSI may return to tank via solenoid valve SS-11, or may be used to add a pressure regeneration circuit that can be used for pressure economy and efficiency. For restoration of the 5100 PSI oil to the full 5600 PSI oil, oil fluid from the accumulator ACCU-1 can be used with all valves closed except for solenoid valves SS-27, SS-8, SS-19, SS-23 and SS-32. This is one of two ways to transfer the 5300 PSI service pressure with 5600 PSI transfer pressure. The intensifiers 20 may continue cycling until accumulator ACCU-1 volume is restored with all valves closed except for pressure reducing valve PRV-3 and solenoid valves SS-12, SS-7, SS-27 and SS-1 open. If accumulator ACCU-1 shows no pressure refill with the low pressure oil pump, pressure reducing valve PRV-3 and solenoid valves SS-3, SS-5, SS-8 and SS-27 may be opened with the pump on. After complete fill, full pressure with 5600 PSI transfer pressure may be restored from the intensifier 20. To perform on the two minute cycle, for example, multiple intensifiers 20 should be used, with operational overlaps between two columns or more of intensifiers 20 for timing requirements. And, the system may include several compression cylinders 10 and transfer cylinders 10*a*. Note, solenoid valves SS-25, SS-17, SS-31 and pressure relief valve PR-5 may serve the same function as solenoid valves SS-23, SS-32, SS-30 and pressure relief valve PR-3, respectively, but for transfer cylinder 10*a*.

The last compression cylinder 10 or transfer cylinder 10*a* in the system transfers the pressurized oil, e.g., at 5100 PSI to 5300 PSI, or a lower pressure as required by the hydraulic motor 39, to a solenoid 4-way controller CV-2, that opens ports A to P to allow the pressurized oil in the line to pass to an accumulator bank 37, which may comprise one or more accumulators that hold the pressurized oil. The oil may be held at a pressure of 5300 PSI, or a lower pressure, such as at 5100 PSI. Distribution of the pressurized oil from the accumulator bank 37 is controlled by the controls (e.g., the control unit) in the control room 31, as discussed above. The controls in the control room 31 regulate the amount of pressurized oil utilized from the accumulator bank 37 to run the hydraulic motor 39. The hydraulic motor 39 uses the pressure from the pressurized oil to produce drive energy. The drive energy may be used to turn a generator, such as an electric generator 50 that produces electricity, or other type of energy generator. Electricity generation requirements may include NEMA rated voltage for the generator at the rated frequency (Nameplate) volts, speed, 200, 230, 460 and 550 volts in the U.S.A., and other 60 Hertz systems. In other locations, drive energy may be changed to fit the generator voltage, speed and phase, and may be sized in accordance. The baseline for the power stroke is one minute with recycle of 1 minute for one line. Pipes and tubing may use this as maximum flow rate for sizing. The schematic shown in FIG. 5 represents the basic functions for using low water pressure to create high pressure hydraulic oil and transfer the oil for use by a hydraulic motor 39 to drive an electricity generator 50 for medium size systems. For larger systems, the basic functions may be divided into groups that operate with more independence for timing, such as:

Group 1: Refill the oil cylinder 23 with low pressure oil (e.g., at 25 PSI to 150 PSI) and refill the compression cylinder 10 with low pressure oil (e.g., at 25 PSI to 150 PSI).

Group 2: Refill the intensifier 20 with low pressure water (e.g., 100 PSI) to compress the oil in the oil cylinder 23 to service pressure (e.g., 5300 PSI), and transfer the pressurized oil and volume required to fill compression cylinder 10 with oil at the service pressure (e.g., 5300 PSI).

Group 3: Transfer the service pressure (e.g., 5300 PSI) and volume to the accumulator bank 37.

Group 4: Operate the generator 50 with the hydraulic motor 39.

The filtration return re-pressure provided between the water source 33 and the water return acts as a faucet that controls water to flow to the water source 33. Solenoid valve SS-2 can be opened to serve as a drain for the water return. Solenoid valve SS-18 is a check valve that is closed to prevent pressurized oil from the accumulators ACCU-1 and ACCU-2 from entering the compression cylinder 10.

The single line of intensifiers 20 illustrated in FIG. 5 can be made more efficient by using a second line of intensifiers 20 to work with the first line, and having the second line do the recycle operation while the first line is producing the high pressure oil for hydraulic drive energy. Then the first line recycles and the second line produces drive energy, and the cycle continues. This would make the operation more efficient and save hydraulic components for up to four lines. Note at the same time the high pressure oil is transferred to the accumulator bank 37, a new line fills the other end of the compression cylinder transferring the next load of pressure to the accumulator bank 37, and so the system cycles again.

In the case of conversion, the size of an existing electric generator 50 and the intensifier high pressure output to feed the accumulator bank 37 should be integrated for maximum performance. The shutdown of the energy chain can be made in several ways. An emergency shutdown of the system may be implemented using a stop hydraulic valve on a control unit that would stop oil flow to the hydraulic motor 39 and cut the drive force to the generator 50. The remainder of the system would continue to build up maximum pressure and stop. For a shutdown of the pressure system, solenoid valve SS-1 is closed with solenoid valve SS-10 open. Water may return to tank ("water return") via solenoid valve SS-10. Then all other valves are closed. Normal start up or shutdown of the system may depend on the size of the system. A relatively larger system may require more time to avoid shock propagation of a pressure wave, especially on a fast shutdown. It may thus be helpful to use a 30-second start up and a 60-second shutdown to start with.

Figure 7:
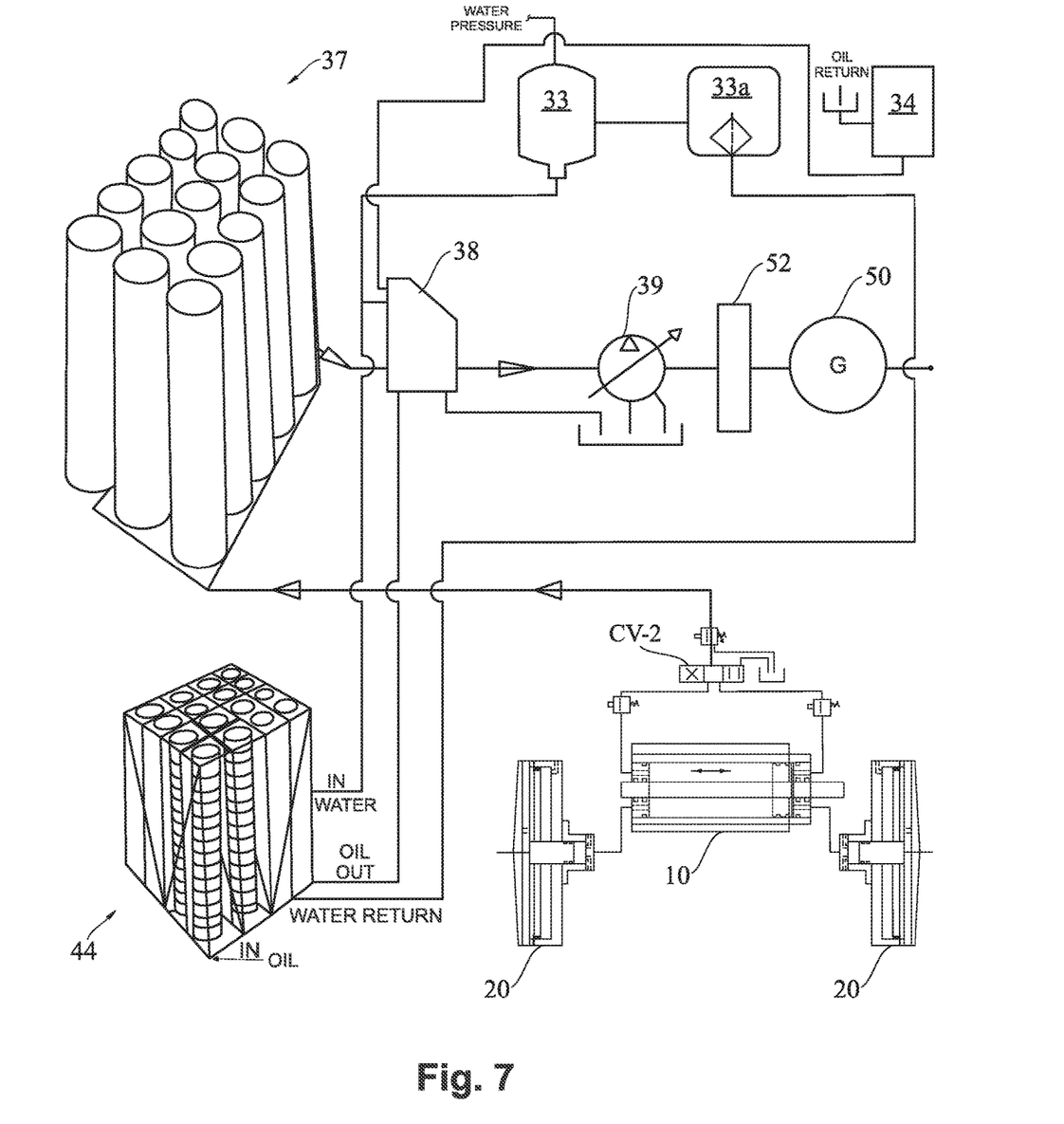
FIG. 7 is a basic concept of the system for producing drive energy, according to an embodiment.

FIG. 7 is a basic concept of the system for producing drive energy, according to an embodiment. This figure shows a unit 40 including two intensifiers 20 in fluid communication with a compression cylinder 10. The unit 40 may be one of several units 40 in a tower cluster 44. Pressurized oil from the unit 40 passes through a solenoid 4-way controller CV-2 to an accumulator bank 37. Distribution of the pressurized oil from the accumulator bank 37 is controlled by the controls 38 in the control room 31, as discussed above. The controls 38 in the control room 31 regulate the amount of pressurized oil utilized from the accumulator bank 37 to run the hydraulic motor 39. The hydraulic motor 39 uses the pressure from the pressurized oil to produce drive energy. The drive energy may be used to turn a generator, such as an electric generator 50 that produces electricity, or other type of energy generator. Gears 52 may be provided between the hydraulic motor 39 and the generator 50 to assist in turning the generator 50. The gears 52 may be in a gear box that sets the basic speed range that is needed for the type of generator to be used. The gear box also allows for the opportunity to use multiple hydraulic drives to run the entire system. The basic concept also shows the water line from the water source 33 and a water return line to the water source, which may include an additional tank 33a.

A method for producing drive energy may include filling the oil cylinder 23 of the intensifier 20 with oil from an oil source 34 at a first predetermined oil pressure (e.g., 25 PSI to 150 PSI), and filling the compression cylinder 10 with oil from the oil source 34 at the first predetermined oil pressure (e.g., 25 PSI to 150 PSI). Water is then added under pressure from a water source 33 to a water cylinder 21 of the intensifier 20, so that the water under pressure pressurizes the oil in the oil cylinder 23 to a second predetermined pressure (e.g., 5600 PSI), which is referred to as the transfer pressure. Pressurized oil from the oil cylinder 23 is the amount of cubic inches required for the compression of the 9.2 gallons in the compression cylinder 10 to provide 5600 PSI. The oil is then transferred out of the oil cylinder 23 at the second predetermined pressure (e.g., 5600 PSI). Via the control of pressure reducing valve PRV-3, some of the pressurized oil transferred from the oil cylinder 23 is maintained at the transfer pressure (e.g., 5600 PSI). Via control of the solenoid valve SS-4 some of the pressurized oil transferred from the oil cylinder 23 is lowered to a third predetermined pressure (e.g., 5300 PSI), which is referred to as the service pressure. The oil at the service pressure (e.g., 5300 PSI) is transmitted to the compression cylinder 10 so that oil collected in the compression cylinder 10 is pressurized to the third predetermined pressure (e.g., 5300 PSI). Subsequently, the oil at the transfer pressure (e.g., 5600 PSI) is transmitted to the compression cylinder 10 so that oil collected in the compression cylinder 10 is transferred out of the compression cylinder 10 at the service pressure (e.g., 5300 PSI). The oil transferred from the compression cylinder at the service pressure (e.g., 5300 PSI) is then received at a hydraulic motor 39, and the hydraulic motor 39 utilizes the service pressure (e.g., 5300 PSI) to drive the hydraulic motor 39. The method may include discharging the oil at the service (e.g., 5300 PSI) pressure from the compression cylinder 10 to an accumulator bank 37, and then discharging the oil from the accumulator bank 37 to the hydraulic motor 39. Further, the hydraulic motor 39 may be driven to turn an electric generator 50 so that the electric generator 50 produces electricity.

The method may also include discharging the oil at the service pressure (e.g., 5300 PSI) from the compression cylinder 10 to a transfer cylinder 10*a*, and then discharging the oil from the transfer cylinder 10*a* to the hydraulic motor 39. Further, the oil may be transferred at a pressure (e.g., 5100 PSI) below the third predetermined pressure (e.g., 5300 PSI) from the compression cylinder 10 to the transfer cylinder 10*a*.

The method may further include filling an oil cylinder 23 of a second intensifier 20, or of several more intensifiers 20, with oil from the oil source 34 at the first predetermined oil pressure (e.g., 25 PSI to 150 PSI); adding water under pressure from the water source 33 to a water cylinder 21 of the second or more intensifiers 20, so that the water under pressure (which may come from a utility water pressure of 60 PSI to 100 PSI) pressurizes the oil in the oil cylinder 23 of all of the intensifiers 20 in the system line; and moving pressurized oil from the oil cylinders 23 in the second or more intensifiers 20 at the second predetermined pressure (e.g., 5600 PSI), and maintaining some of the pressurized oil at the second predetermined pressure (e.g., 5600 PSI) and reducing some of the pressurized oil to a third predetermined pressure (e.g., 5300 PSI via pressure reducing valve PRV-1) that is less than the second predetermined pressure. It is noted that in the method and (in the system discussed above), each intensifier 20 has an accompanying compression/transfer cylinder 10. In addition, the method may include all of the other aspects of the system and apparatus discussed herein.

While various embodiments usable within the scope of the present disclosure have been described with emphasis, it should be understood that within the scope of the appended claims, the present invention can be practiced other than as specifically described herein.

What is claimed is:

1. A system for producing drive energy, comprising:
a control unit;
an intensifier that receives water from a water source and oil from an oil source, that pressurizes the oil, and that transfers pressurized oil out of the intensifier;
a compression cylinder that receives oil from the oil source and the pressurized oil from the intensifier so that oil collected in the compression cylinder is pressurized to a predetermined pressure, and that transfers the oil at the predetermined pressure out of the compression cylinder;
at least one control valve for controlling the oil to be received by the compression cylinder from the oil source and for controlling the oil transferred at the predetermined pressure; and
a hydraulic motor that receives the oil transferred at the predetermined pressure, and that utilizes the predetermined pressure to drive the hydraulic motor.

2. The system according to claim 1, further including an accumulator bank, wherein the oil transferred at the predetermined pressure is transferred from the compression cylinder to the accumulator bank, and from the accumulator bank to the hydraulic motor.

3. The system according to claim 1, wherein the drive of the hydraulic motor turns an electric generator so that the electric generator produces electricity.

4. The system according to claim 1, wherein the intensifier comprises an oil cylinder, and the control unit causes oil from the oil source to fill the oil cylinder and the compression cylinder.

5. The system according to claim 4, wherein the intensifier further comprises a water cylinder, and the control unit causes water from the water source to be added under pressure to the water cylinder, wherein a force of the water under pressure in the water cylinder pressurizes the oil in the oil cylinder so that pressurized oil from the oil cylinder is transferred through the at least one control valve and into the compression cylinder to pressurize the oil in the compression cylinder to the predetermined pressure.

6. The system according to claim 5, wherein the control unit causes the pressurized oil in the compression cylinder to be transferred at the predetermined pressure to the hydraulic motor to drive the hydraulic motor.

7. The system according to claim 1, wherein the system comprises a plurality of intensifiers arranged in a series and in parallel.

8. The system according to claim 7, wherein the system comprises a plurality of compression cylinders arranged in a series and in parallel.

9. An intensifier comprising:
a water cylinder including at least one water port for receiving water from a water source and for discharging the water to a return tank;
an oil cylinder including an oil port for receiving oil from an oil source and for discharging the oil under pressure;
a water piston located in the water cylinder;
an oil piston that is attached to the water piston and that protrudes into the oil cylinder; and
a rolling diaphragm provided on the water piston and forming a seal between an outer circumferential surface of the water piston and an inner surface of the water cylinder, wherein the rolling diaphragm is configured to roll along the inner surface of the water cylinder and along the outer circumferential surface of the water piston while maintaining the seal,
wherein the water piston is configured to move the oil piston within the oil cylinder upon receiving pressure from water exerted on the water piston from the water source, wherein the oil piston is configured to compresses the oil in the oil cylinder when the oil piston is moved by the water piston to pressurize the oil in the oil cylinder.

10. The intensifier according to claim 9, wherein the water piston comprises a surface area that faces the water received into the water cylinder, the oil piston comprises a piston head having a surface area that faces the oil received into the oil cylinder, and the surface area of the water piston is greater than the surface area of the oil piston head.

11. The intensifier according to claim 10, wherein the surface area of the water piston is 1075.5 square inches, and the surface area of the oil piston head is 18.60 square inches.

12. A method for producing drive energy, comprising:
filling an oil cylinder of an intensifier with oil from an oil source at a first predetermined oil pressure;
filling a compression cylinder with oil from the oil source at the first predetermined oil pressure;

adding water under pressure from a water source to a water cylinder of the intensifier, so that the water under pressure pressurizes the oil in the oil cylinder to a second predetermined pressure;

discharging pressurized oil from the oil cylinder at the second predetermined pressure, and maintaining some of the pressurized oil at the second predetermined pressure and reducing some of the pressurized oil to a third predetermined pressure that is less than the second predetermined pressure;

transmitting the oil at the third predetermined pressure to the compression cylinder so that oil collected in the compression cylinder is pressurized to the third predetermined pressure;

transmitting the oil at the second predetermined pressure to the compression cylinder so that oil collected in the compression cylinder is transferred out of the compression cylinder at the third predetermined pressure;

receiving the oil transferred from the compression cylinder at the third predetermined pressure at a hydraulic motor; and utilizing the third predetermined pressure to drive the hydraulic motor.

13. The method according to claim 12, further comprising discharging the oil at the third predetermined pressure from the compression cylinder to an accumulator bank, and then discharging the oil from the accumulator bank to the hydraulic motor.

14. The method according to claim 12, further comprising driving the hydraulic motor to turn an electric generator so that the electric generator produces electricity.

15. The method according to claim 12, further comprising moving the oil at the third predetermined pressure from the compression cylinder to a transfer cylinder, and then discharging the oil from the transfer cylinder to the hydraulic motor.

16. The method according to claim 15, further comprising discharging the oil at a pressure below the third predetermined pressure from the compression cylinder to the transfer cylinder.

17. The method according to claim 12, further comprising:
filling an oil cylinder of a second intensifier with oil from the oil source at the first predetermined oil pressure;
adding water under pressure from the water source to a water cylinder of the second intensifier, so that the water under pressure pressurizes the oil in the oil cylinder of the second intensifier; and
moving pressurized oil from the oil cylinder in the second intensifier at the second predetermined pressure, and maintaining some of the pressurized oil at the second predetermined pressure and reducing some of the pressurized oil to a third predetermined pressure that is less than the second predetermined pressure.

* * * * *